US007934839B2

(12) United States Patent
Noda

(10) Patent No.: US 7,934,839 B2
(45) Date of Patent: May 3, 2011

(54) IMAGE PROJECTION APPARATUS

(75) Inventor: Toshiyuki Noda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 12/178,740

(22) Filed: Jul. 24, 2008

(65) Prior Publication Data

US 2009/0051881 A1 Feb. 26, 2009

(30) Foreign Application Priority Data

Jul. 27, 2007 (JP) ................................ 2007-196743

(51) Int. Cl.
G03B 21/18 (2006.01)

(52) U.S. Cl. ........................................................ 353/61

(58) Field of Classification Search .................... 353/55, 353/60, 61, 57, 98; 362/264, 345, 373; 348/748
See application file for complete search history.

(56) References Cited

U.S. PATENT DOCUMENTS

| 6,976,760 B2 | 12/2005 | Ito et al. |
| 7,350,926 B2 * | 4/2008 | Fukuda et al. .................. 353/55 |
| 2006/0061996 A1 | 3/2006 | Wang et al. |

FOREIGN PATENT DOCUMENTS

| JP | 06-338212 A | 12/1994 |
| JP | 2002-174857 A | 6/2002 |

* cited by examiner

Primary Examiner — Georgia Y Epps
Assistant Examiner — Don Williams
(74) Attorney, Agent, or Firm — Canon U.S.A., Inc. I.P. Division

(57) ABSTRACT

The image projection apparatus includes a light source lamp including a discharge light emitting tube and a reflector, the discharge light emitting tube including a light emitting portion disposed inside of the reflector and an electrode portion disposed outside of the reflector, a cooling fan, and a duct configured to guide a cooling air flowed by operation of the cooling fan toward the light source lamp. The duct includes a first air guiding portion and a second air guiding portion that cause parts of the cooling air to respectively proceed toward a first area and a second area opposite to each other on an outer circumferential surface of the light emitting portion, and a third air guiding portion that causes another part of the cooling air to proceed toward the electrode portion.

3 Claims, 8 Drawing Sheets

PRIOR ART

IMAGE PROJECTION APPARATUS

BACKGROUND OF THE INVENTION

The present invention relates to an image projection apparatus which projects an image using light from a light source lamp, and more particularly to a cooling structure of the light source lamp.

Image projection apparatuses such as liquid crystal projectors use a discharge light source lamp such as a halogen lamp, a xenon lamp, a metal halide lamp, or an ultra-high pressure mercury lamp.

Such a light source lamp includes a discharge light emitting tube in which its glass tube contains gas including mercury or the like sealed therein and electrodes are formed at the both ends of the glass tube, and a concave mirror (reflector) for converting a light flux from the discharge light emitting tube into a collimated light flux or a converged light flux.

FIG. 7 shows the shape of a common light source lamp 100. A discharge light emitting tube 101 includes a spherical light emitting portion 101A, and a first sealing portion (electrode portion) 101c and a second sealing portion (electrode portion) 101d which respectively extend to a front side and a back side from the light emitting portion 101A. The discharge light emitting tube 101 is connected to a reflector 102 with a connecting member 103.

The light emitting portion 101A and the first sealing portion 101c of the discharge light emitting tube 101 are disposed inside the reflector 102, while the second sealing portion 101d is covered by the connecting member 103 and disposed outside (on the back side) of the reflector 102.

In order to maintain such a light source lamp 100 (discharge light emitting tube 101) in a good discharge light emission state, it is necessary to respectively control the temperatures of an upper portion 101a and a lower portion 101b of the spherical light emitting portion 101A shown in FIG. 7 within ranges of, for example, from 900° C. to 1000° C. and 900±20° C. Temperature control for the sealing portions 101c and 101d is also necessary to maintain them at, for example, not more than 420° C.

Accordingly, most image projection apparatuses have a cooling fan disposed near the light source lamp for forced cooling of the light source lamp using an air guiding member such as a duct.

Japanese Patent Laid-Open No. 2002-174857 discloses an image projection apparatus having a duct structure which divides a cooling air from a cooling fan into a cooling air for cooling the inside of the reflector, a cooling air for cooling the outer circumference of the reflector, and a cooling air for cooling an inner side of an exterior case.

Japanese Patent Laid-Open No. 6-338212 discloses an image projection apparatus capable of cooling various parts of a light source lamp appropriately by dividing, inside a reflector, a cooling air from a cooling fan into a cooling air proceeding toward a light emitting portion of a light emitting tube and a cooling air proceeding toward a sealing portion.

Higher intensity and further noise reduction are desired for image projection apparatuses. Noise from the image projection apparatus is mainly generated in association with cooling of heat generating portions with a cooling fan. Therefore, it is necessary, for noise reduction, to reduce the rotation speed of the cooling fan as much as possible so as to cool various heat generating portions appropriately with a small flow volume of air.

What is desirable about the light source lamp is that cooling airs are guided efficiently to the upper and lower portions of the light emitting portion, and that an appropriate flow volume of a cooling air is also guided toward the sealing portion disposed outside the reflector.

This will be explained in more detail with reference to FIG. 7. The upper portion 101a of the light emitting portion 101A that emits light by a discharge phenomenon is a portion whose temperature becomes the highest in the light emitting tube 101. A too high temperature thereof causes a thermal deformation of the glass tube constituting the light emitting tube 101 or causes an abnormal rise in vapor pressure inside the light emitting tube 101, which may invite a malfunction of the light emitting tube 101.

On the other hand, the lower portion 101b of the light emitting portion 101A has a relatively low temperature in the light emitting portion 101A due to the influence of natural convection of an air therearound. However, lack of appropriate temperature control for the lower portion 101b may reduce lifetime or light emission efficiency of the light emitting tube 101 because it causes abnormality in the cycle of a light emission mechanism.

The sealing portions 101c and 101d seal the gas inside the light emitting tube 101 and are provided with the electrodes. If their temperature becomes too high, a metal material such as molybdenum inside the sealing portions 101c and 101d may oxidize and melt.

Thus, it is important to perform appropriate temperature control for the above-mentioned four portions of the light emitting tube. In contrast, a portion other than the above four portions, for example, a side face 101e of the light emitting portion 101A shown in FIG. 9, hardly affects the performance or lifetime of the light emitting tube even if temperature control by cooling is not performed actively.

However, in the apparatuses disclosed in Japanese Patent Laid-Open Nos. 2002-174857 and 6-338212, the cooling air is guided toward the side face of the light emitting portion 101A as shown in FIG. 8. In other words, the upper portion 101a, the lower portion 101b, and the side face 101e of the light emitting portion 101A shown in FIGS. 7 and 9 are cooled collectively.

That is, in the configurations disclosed in Japanese Patent Laid-Open Nos. 2002-174857 and 6-338212, the cooling of the light emitting tube 101 is not optimized, and more cooling air than necessary is introduced into the reflector 102. This increases the rotation speed of the cooling fan and invites a noise increase associated therewith.

BRIEF SUMMARY OF THE INVENTION

The present invention provides an image projection apparatus capable of reducing noise by efficiently guiding a cooling air to portions, which require temperature control, of a light emitting tube inside and outside of a reflector.

The present invention provides, according to an aspect thereof, an image projection apparatus that includes a light source lamp including a discharge light emitting tube and a reflector, the discharge light emitting tube including a light emitting portion disposed inside of the reflector and an electrode portion disposed outside of the reflector, a cooling fan, and a duct configured to guide a cooling air flowed by operation of the cooling fan toward the light source lamp. The duct includes a first air guiding portion and a second air guiding portion that cause parts of the cooling air to respectively proceed toward a first area and a second area opposite to each other on an outer circumferential surface of the light emitting portion, and a third air guiding portion that causes another part of the cooling air to proceed toward the electrode portion.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Overall Configuration of Projector

Figure 3:
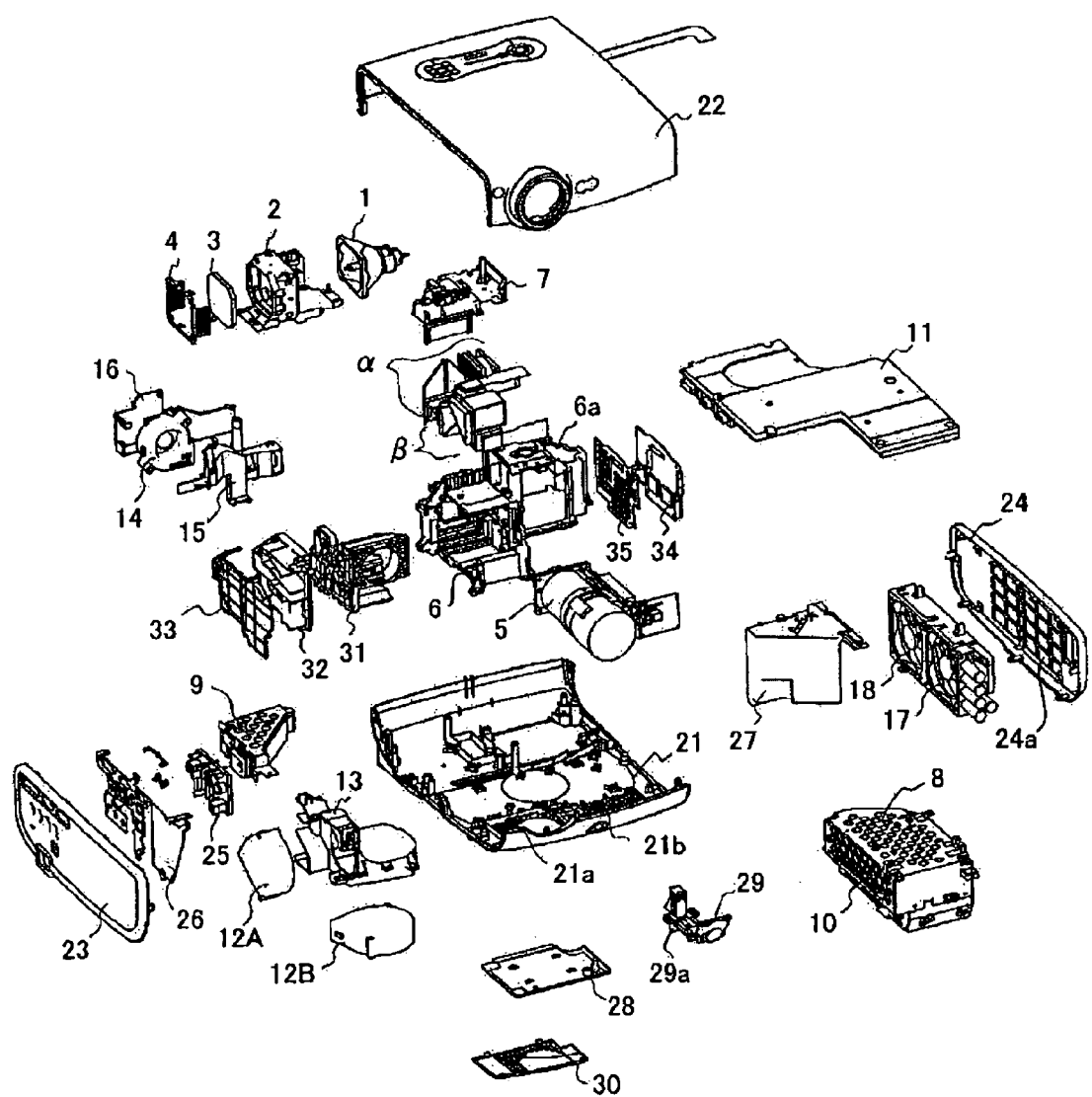
FIG. 3 is an exploded perspective view showing the entire configuration of the liquid crystal projector of Embodiment 1.

FIG. 3 shows the configuration of a liquid crystal projector (image projection apparatus) that is a first embodiment (Embodiment 1) of the present invention.

In this figure, reference numeral 1 denotes a light source lamp (hereinafter referred to simply as "lamp"), which is an ultra high-pressure mercury discharge lamp in this embodiment. However, discharge lamps other than the ultra high-pressure mercury discharge lamp may be used as the lamp 1, such as a halogen lamp, a xenon lamp, and a metal halide lamp.

Reference numeral 2 denotes a lamp holder which holds the lamp 1, 3 an explosion-proof glass, and 4 a glass holder. Reference symbol α denotes an illumination optical system which converts light from the lamp 1 into collimated light with a uniform luminance distribution. Reference symbol β denotes a color separating/combining optical system. The color separating/combining optical system β separates the light from the illumination optical system α into a red (R) light component, a green (G) light component and a blue (B) light component, guides them to liquid crystal panels for R, G, and B, respectively, and then combines the light components from the liquid crystal panels.

Reference numeral 5 denotes a projection lens barrel which projects the light from the color separating/combining optical system β onto a projection surface such as a screen, not shown. A projection optical system, described later, is housed in the projection lens barrel 5.

Reference numeral 6 denotes an optical box which accommodates the lamp 1, the illumination optical system α, and the color separating/combining optical system β, and to which the projection lens barrel 5 is fixed. The optical box 6 has a lamp case portion 6a formed thereon, which surrounds the lamp 1.

Reference numeral 7 denotes an optical box lid which covers the optical box 6 accommodating the illumination optical system α and the color separating/combining optical system β. Reference numeral 8 denotes a PFC (Power Factor Correction) power supply board which generates DC power for each of circuit boards from a commercial power supply. Reference numeral 9 denotes a power supply filter board, and 10 a ballast power supply board which drives (lights) the lamp 1 together with the PFC power supply board 8.

Reference numeral 11 denotes a control board which drives the liquid crystal panels and controls lighting of the lamp 1 with power from the PFC power supply board 8.

Reference numerals 12A and 12B denote first and second optical system cooling fans, respectively, which take in air through an air inlet 21a formed in a lower exterior case 21, later described, to cool optical elements such as the liquid crystal panels and polarizing plates provided in the color separating/combining optical system β.

Reference numeral 13 denotes a first RGB duct which guides the cooling airflows from the first and second optical system cooling fans 12A and 12B to the optical elements in the color separating/combining optical system β.

Reference numeral 14 denotes a lamp cooling fan which sends a blowing airflow to the lamp 1 to cool it. Reference numeral 15 denotes a first lamp duct which holds the lamp cooling fan 14 and guides the cooling airflow to the lamp 1. Reference numeral 16 denotes a second lamp duct which holds the lamp cooling fan 14 and forms the duct together with the first lamp duct 15.

Reference numeral 17 denotes a power supply cooling fan which takes in air through an air inlet 21b formed in the lower exterior case 21 to circulate a cooling airflow within the PFC power supply board 8 and the ballast power supply board 10 to cool them. Reference numeral 18 denotes an exhaust fan which exhausts air that has been provided from the lamp cooling fan 14 to the lamp 1 and whose temperature is increased by cooling the lamp 1 through an exhaust air outlet 24a formed in a second side plate 24, later described.

The lower exterior case 21 accommodates the lamp 1, the optical box 6, the power supply system boards 8 to 10, the control board 11 and the like.

Reference numeral 22 denotes an upper exterior case which covers the lower exterior case 21 accommodating the optical box 6 and the like. Reference numeral 23 denotes a first side plate which covers side openings formed by the cases 21 and 22 together with the second side plate 24. The lower exterior case 21 has the abovementioned air inlets 21a and 21b formed therein, and the side plate 24 has the exhaust air outlet 24a formed therein. The lower exterior case 21, the upper exterior case 22, the first side plate 23 and the second side plate 24 constitute a chassis (case) of the projector.

Reference numeral 25 denotes an interface board on which connectors for receiving various signals are mounted, and 26 an interface reinforcement plate attached to the inside face of the first side plate 23.

Reference numeral 27 denotes an exhaust duct which guides the heated exhaust air from the lamp 1 to the exhaust fan 18 to prevent diffusion of the exhaust air in the chassis.

Reference numeral 28 denotes a lamp lid. The lamp lid 28 is removably provided on the bottom of the lower exterior case 21 and is fixed thereto by screws, not shown. Reference numeral 29 denotes a set adjustment leg. The set adjustment leg 29 is fixed to the lower exterior case 21, and the height of its leg 29*a* is adjustable. The adjustment of the height of the leg 29*a* enables adjustment of an inclination angle of the projector.

Reference numeral 30 denotes an RGB air intake plate which holds a filter, not shown, attached to the outside of the air inlet 21*a* formed in the lower exterior case 21.

Reference numeral 31 denotes a prism base which holds the color separating/combining optical system A. Reference numeral 32 denotes a box side cover which has duct-shaped portions for guiding the cooling airflows from the first and second optical system cooling fans 12A and 12B for cooling the optical elements and the liquid crystal panels in the color separating/combining optical system β. Reference numeral 33 denotes a second RGB duct which forms the duct together with the box side cover 32.

Reference numeral 34 denotes an RGB board to which flexible boards extending from the liquid crystal panels disposed in the color separating/combining optical system β are connected and which is connected to the control board 11.

Reference numeral 35 denotes an RGB cover which prevents electrical noise from entering the RGB board.

(Optical Configuration)

Figure 4:
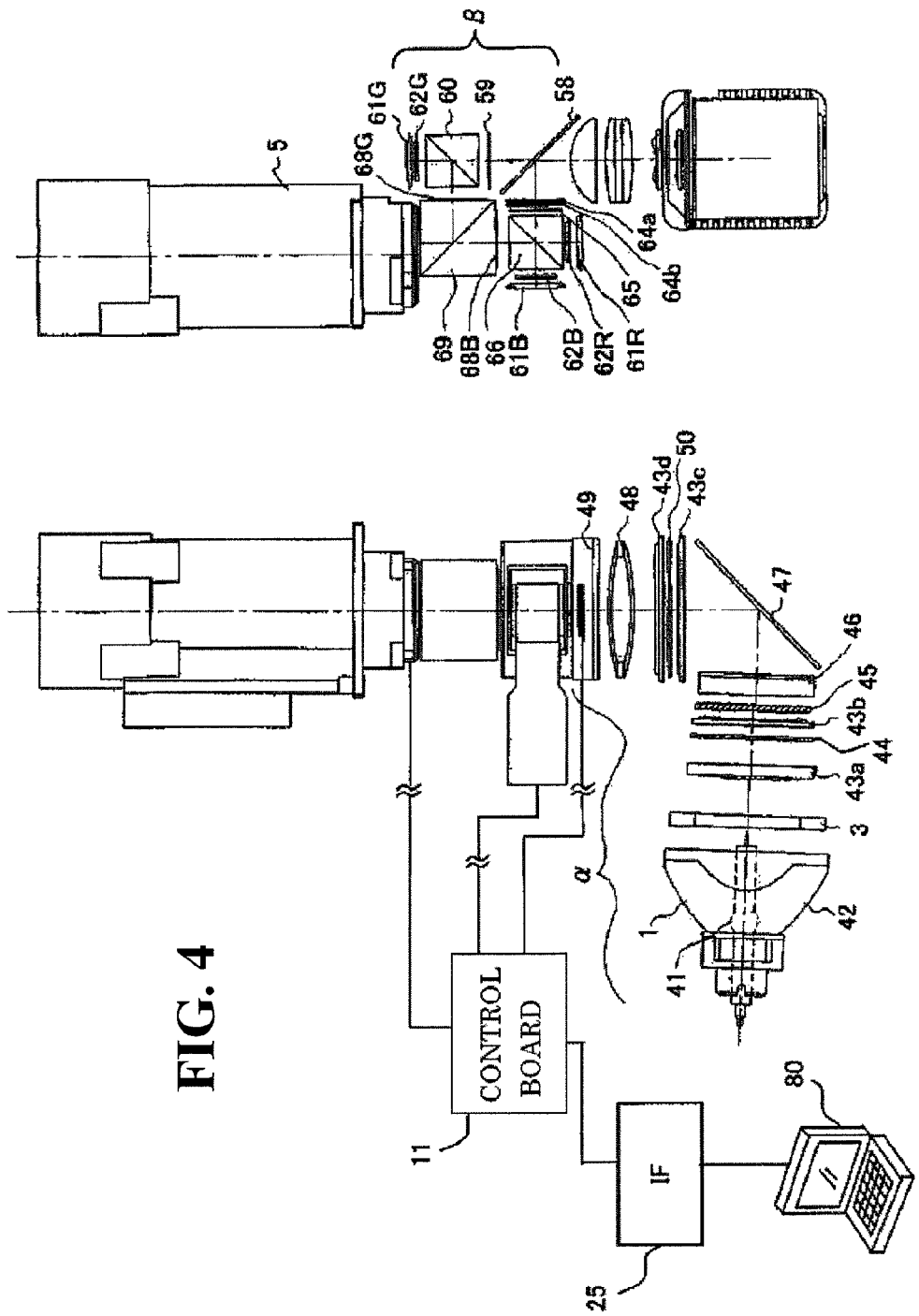
FIG. 4 shows top and side views of the optical configuration of the liquid crystal projector of Embodiment 1.

Next, description will be made of the configuration of the entire optical system formed of the above-mentioned lamp 1, the illumination optical system α, the color separating/combining optical system β and the projection lens barrel (projection optical system) 5 with reference to FIG. 4. FIG. 4 shows a horizontal section and a vertical section of the optical system.

In the figure, reference numeral 41 denotes a discharge light-emitting tube (hereinafter referred to simply as "light-emitting tube") which emits white light with a continuous spectrum, and 42 a reflector which has a concave mirror to collect the light from the light-emitting tube 41 in a predetermined direction. The light-emitting tube 41 and the reflector 42 constitute the lamp 1.

Reference numeral 43*a* denotes a first cylinder array which is formed by arranging plural cylindrical lens cells each having a refractive power in a horizontal direction shown in the left in the figure, 43*b* a second cylinder array which has plural cylindrical lens cells corresponding to the respective lens cells of the first cylinder array 43*a*. Reference numeral 44 denotes an ultraviolet absorbing filter, and 45 a polarization conversion element which converts non-polarized light into polarized light having a predetermined polarization direction.

Reference numeral 46 denotes a front compressor which is formed of a cylindrical lens having a refractive power in a vertical direction shown in the right in the figure. Reference numeral 47 denotes a reflecting mirror which bends an optical axis from the lamp 1 by substantially 90 degrees (in more detail, by 88 degrees).

Reference numeral 43*c* denotes a third cylinder array which is formed by arranging plural cylindrical lens cells each having a refractive power in the vertical direction. Reference numeral 43*d* denotes a fourth cylinder array which has plural cylindrical lens cells corresponding to the respective lens cells of the third cylinder array 43*c*.

Reference numeral 50 denotes a color filter which returns color light in a specific wavelength range to the lamp 1 for adjustment of color coordinates to predetermined values. Reference numeral 48 denotes a condenser lens. Reference numeral 49 denotes a rear compressor which is formed of a cylindrical lens having a refractive power in the vertical direction. The abovementioned components constitute the illumination optical system α.

Reference numeral 58 denotes a dichroic mirror which reflects light in wavelength ranges of blue (B: for example, 430 nm to 495 nm) and red (R: for example, 590 nm to 650 nm) and transmits light in a wavelength range of green (G: for example, 505 nm to 580 nm). Reference numeral 59 denotes an entrance-side polarizing plate for G which includes a polarizing element attached on a transparent substrate and transmits only P-polarized light. Reference numeral 60 denotes a first polarization beam splitter which has a polarization splitting surface formed of a multi-layered film. The polarization splitting surface transmits P-polarized light and reflects S-polarized light.

Reference numerals 61R, 61G and 61B denote a reflective liquid crystal panel for R, a reflective liquid crystal panel for G, and a reflective liquid crystal panel for B, respectively, each being a light modulation element (or image-forming element) which reflects and image-modulates entering light. Reference numerals 62R, 62G and 62B denote a quarter-wave plate for R, a quarter-wave plate for G, and a quarter-wave plate for B, respectively.

Reference numeral 64*a* denotes a trimming filter which returns orange light to the lamp 1 for enhancing the color purity of red. Reference numeral 64*b* denotes an entrance-side polarizing plate for R and B which includes a polarizing element attached on a transparent substrate and transmits only P-polarized light.

Reference numeral 65 denotes a color-selective phase plate which converts a polarization direction of R light by 90 degrees and does not convert a polarization direction of B light. Reference numeral 66 denotes a second polarization beam splitter which has a polarization splitting surface transmitting P-polarized light and reflecting S-polarized light.

Reference numeral 68B denotes an exit-side polarizing plate for B which transmits only an S-polarized light component of the B light. Reference numeral 68G denotes an exit-side polarizing plate for G which transmits only S-polarized light of the G light. Reference numeral 69 denotes a dichroic prism which transmits the R light and the B light and reflects the G light.

The abovementioned components from the dichroic mirror 58 to the dichroic prism 69 constitute the color separating/combining optical system A.

In this embodiment, the polarization conversion element 45 converts P-polarized light into S-polarized light. The P-polarized light and S-polarized light are herein described relative to the polarization direction of light at the polarization conversion element 45. On the other hand, the light entering the dichroic mirror 58 is considered relative to the polarization direction at the first and second polarization beam splitters 60 and 66, the light being regarded as P-polarized light. While the light emerging from the polarization conversion element 45 is S-polarized light, the S-polarized light is defined as P-polarized light when it enters the dichroic mirror 58.

(Optical Actions)

Next, the optical actions will be described. The light emitted from the light-emitting tube 41 is collected in the predetermined direction by the reflector 42. The reflector 42 has a parabolic shape, and the light flux from the focal point of the parabolic surface is converted into a light flux parallel to the axis of symmetry of the parabolic surface. However, since the light source in the light-emitting tube 41 is not an ideal point light source and has a finite size, the collected light flux contains a large amount of component not in parallel with the axis of symmetry of the parabolic surface.

The light flux enters the first cylinder array 43*a* through the explosion-proof glass 3. The light flux entering the first cylinder array 43*a* is divided into plural light fluxes in accordance with the number of the cylindrical lens cells thereof and collected thereby to form plural light fluxes each of which has a band-like shape and which are arranged in the vertical direction. These light fluxes are passed through the ultraviolet absorbing filter 44 and the second cylinder array 43b and then form plural images of the light source near the polarization conversion element 45.

The polarization conversion element 45 is constituted by polarization splitting surfaces, reflective surfaces, and half-wave plates. Each of the light fluxes enters the polarization splitting surface corresponding to its row and is separated into a P-polarized light component which has been transmitted through the polarization splitting surface and an S-polarized light component which has been reflected thereby. Thus, plural light fluxes having the same polarization direction emerge from the polarization conversion element 45

The plural light fluxes converted into the polarized light fluxes by the polarization conversion element 45 are compressed by the front compressor 46, reflected by the reflecting mirror 47 by 88 degrees, and then enter the third cylinder array 43c.

Each of the light flux entering the third cylinder array 43c is divided into plural light fluxes in accordance with the number of the cylindrical lens cells thereof and collected thereby to form plural light fluxes each of which has a band-like shape and which are arranged in the horizontal direction. The plural light fluxes are passed through the fourth cylinder array 43d and the condenser lens 48, and then enter the rear compressor 49.

With the optical actions of the front compressor 46, the condenser lens 48 and the rear compressor 49, rectangular images formed by the plural light fluxes are overlapped with each other to form a rectangular illumination area with a uniform luminance. Each of the reflective liquid crystal panels 61R, 61G and 61B is disposed in the illumination area.

The S-polarized light converted by the polarization conversion element 45 impinges on the dichroic mirror 58. An optical path of the G light transmitted through the dichroic mirror 58 will hereinafter be described.

The G light transmitted through the dichroic mirror 58 enters the entrance-side polarizing plate 59. The G light remains as P-polarized light (S-polarized light relative to the polarizing conversion element 45) after the separation by the dichroic mirror 58. The G light emerges from the entrance-side polarizing plate 59, enters the first polarization beam splitter 60 as P-polarized light, and then is transmitted through the polarization splitting surface thereof to reach the reflective liquid crystal panel 61G.

An image supply apparatus 80 such as a personal computer, a DVD player, and a television tuner is connected to the IF board 25 of the projector. The control circuit 11 drives the reflective liquid crystal panels 61R, 61G and 61B based on image (video) information input from the image supply apparatus 80 and causes them to form original images for the respective colors. Thus, the light entering each reflective liquid crystal panel is modulated (image-modulated) in accordance with the original image and reflected thereby. The projector and the image supply apparatus 80 constitute an image display system.

The reflective liquid crystal panel 61G image-modulates the G light and reflects it. The P-polarized light component of the image-modulated G light is again transmitted through the polarization splitting surface of the first polarization beam splitter 60 and thereby returned toward the light source to be removed from light for projection. On the other hand, the S-polarized light component of the image-modulated G light is reflected by the polarization splitting surface of the first polarization beam splitter 60 toward the dichroic prism 69 as light for projection.

In a state in which all the polarized light components are converted into P-polarized light (in a black display state), adjusting a slow axis of the quarter-wave plate 62G provided between the first polarization beam splitter 60 and the reflective liquid crystal panel 61G to a predetermined direction can reduce the influence of a disturbance of the polarization state caused in the first polarization beam splitter 60 and the reflective liquid crystal panel 61G.

The G light that has emerged from the first polarization beam splitter 60 enters the dichroic prism 69 as S-polarized light, and then is reflected by the dichroic film surface of the dichroic prism 69 to reach the projection lens barrel 5.

Optical paths of the R light and the B light reflected by the dichroic mirror 58 will hereinafter be described. The R light and B light reflected by the dichroic mirror 58 enter the trimming filter 64a. The R light and the B light remain as P-polarized light after the separation by the dichroic mirror 58. The R light and the B light are passed through the trimming filter 64a to remove the orange light component thereof, transmitted through the entrance-side polarizing plate 64b, and then enter the color-selective phase plate 65.

The color-selective phase plate 65 has the function of rotating the polarization direction of only R light by 90 degrees. Thus, the R light and the B light enter the second light beam splitter 66 as S-polarized light and P-polarized light, respectively.

The R light entering the second polarization beam splitter 66 as S-polarized light is reflected by the polarization splitting surface of the second polarization beam splitter 66 to reach the reflective liquid crystal panel 61R. The B light entering the second polarization beam splitter 66 as P-polarized light is transmitted through the polarization splitting surface of the second polarization beam splitter 66 to reach the reflective liquid crystal panel 61B.

The R light entering the reflective liquid crystal panel 61R is image-modulated and reflected thereby. The S-polarized light component of the image-modulated R light is reflected again by the polarization splitting surface of the second polarization beam splitter 66 and thereby returned toward the light source to be removed from light for projection. On the other hand, the P-polarized light component of the image-modulated R light is transmitted through the polarization splitting surface of the second polarization beam splitter 66 to proceed toward the dichroic prism 69 as light for projection.

The B light entering the reflective liquid crystal panel 61B is image-modulated and reflected thereby. The P-polarized light component of the image-modulated B light is transmitted again through the polarization splitting surface of the second polarization beam splitter 66 and thereby returned toward the light source to be removed from light for projection. On the other hand, the S-polarized light component of the image-modulated B light is reflected by the polarization splitting surface of the second polarization beam splitter 66 toward the dichroic prism 69 as light for projection.

Adjusting each of slow axes of the quarter-wave plates 62R and 62B provided between the second polarization beam splitter 66 and the reflective liquid crystal panels 61R and 61B, respectively, can reduce the influence of a disturbance of the polarization state in the black display state for each of the R light and the B light, as is the case for the G light.

Of the R light and B light that are thus combined into one light flux by the second polarization beam splitter 66 and then emerged therefrom, the B light is analyzed by the exit-side polarizing plate 68B and then enters the dichroic prism 69.

The R light is transmitted through the polarizing plate 68B with no change as P-polarized light and then enters the dichroic prism 69.

The analysis by the exit-side polarizing plate 68B removes unnecessary components of the B light caused by passing the second polarization beam splitter 66, the reflective liquid crystal panel 61B, and the quarter-wave plate 62B.

The R light and the B light entering the dichroic prism 69 are transmitted through the dichroic film surface thereof, combined with the G light reflected by the dichroic film surface, and then reach the projection lens barrel 5.

The combined R, G and B light is enlarged and projected by the projection optical system in the projection lens barrel 5 onto the projection surface such as a screen.

The optical paths described above are used when the reflective liquid crystal panels operate in a white display state. Description will hereinafter be made of optical paths when the reflective liquid crystal panels operate in the black display state.

First, an optical path of the G light will be described. The P-polarized light component of the G light transmitted through the dichroic mirror 58 enters the entrance-side polarizing plate 59 and the first polarization beam splitter 60, is transmitted through the polarization splitting surface of the first polarization beam splitter 60, and then reaches the reflective liquid crystal panel 61G. Since the reflective liquid crystal panel 61G is in the black display state, the G light is reflected without image-modulation. Thus, the G light remains as P-polarized light after the reflection by the reflective liquid crystal panel 61G. Therefore, the G light is again transmitted through the polarization splitting surface of the first polarization beam splitter 60 and the entrance-side polarizing plate 59, and returned toward the light source to be removed from light for projection.

Next, optical paths of the R light and B light will be described. The P-polarized light components of the R light and B light reflected by the dichroic mirror 58 enter the entrance-side polarizing plate 64b. They emerge from the entrance-side polarizing plate 64b and then enter the color-selective phase plate 65. Since the color-selective phase plate 65 has the function of rotating the polarization direction of only the R light by 90 degrees, the R light and the B light enter the second beam splitter 66 as S-polarized light and P-polarized light, respectively.

The R light entering the second polarization beam splitter 66 as the S-polarized light is reflected by the polarization splitting surface thereof to reach the reflective liquid crystal panel 61R. The B light entering the second polarization beam splitter as the P-polarized light is transmitted through the polarization splitting surface thereof to reach the reflective liquid crystal panel 61B.

Since the reflective liquid crystal panel 61R is in the black display state, the R light entering the reflective liquid crystal panel 61R is reflected without image-modulation. In other words, the R light remains as the S-polarized light after the reflection by the reflective liquid crystal panel 61R. Thus, the R light is again reflected by the polarization splitting surface of the second polarization beam splitter 66, transmitted through the entrance-side polarizing plate 64b, and then returned toward the light source to be removed from light for projection. As a result, black is displayed.

The B light entering the reflective liquid crystal panel 61B is reflected without image-modulation since the reflective liquid crystal panel 61B is in the black display state. In other words, the B light remains as the P-polarized light after the reflection by the reflective liquid crystal panel 61B. Thus, the B light is again transmitted through the polarization splitting surface of the second polarization beam splitter 66, transmitted through the color-selective phase plate 65 and the entrance-side polarizing plate 64b, and then returned toward the light source to be removed from light for projection.

(Cooling Structure)

Next, a cooling structure in the projector of this embodiment will be described with reference to FIG. 5. As described above, this projector accommodates therein five fans 12A, 12B, 14, 17, and 18 shown in FIG. 3 for flowing airs in plural airflow paths described below to cool their respective cooling targets.

Figure 5:
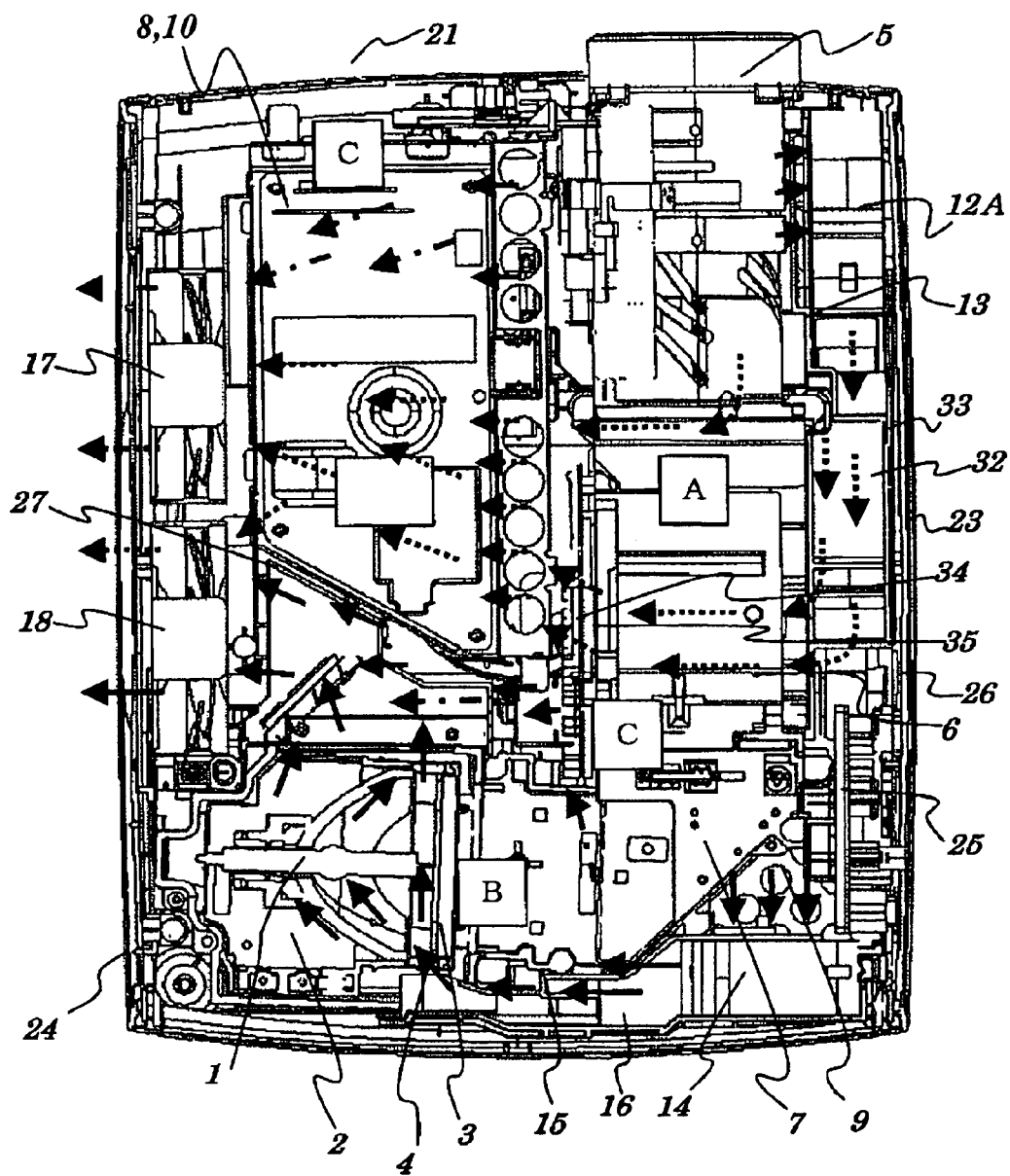
FIG. 5 is a top view showing cooling airflows in the liquid crystal projector of Embodiment 1.

In an airflow path B (first airflow path) indicated by solid-line arrows in FIG. 5, an air sucked into the chassis by the lamp cooling fan 14 is fed as a cooling air through the ducts 15 and 16 to the lamp 1. The airflow having cooled the lamp 1 is guided into the exhaust duct 27 to be exhausted to the outside of the chassis by the exhaust fan 18.

In an airflow path A (second airflow path) indicated by dotted-line arrows in FIG. 5, an air sucked by the first and second cooling fans 12A and 12B from the outside of the chassis flows into the airflow path A through the air inlet 21a formed below the projection lens barrel 5. The second cooling fan 12B is disposed below the projection lens barrel 5.

A cooling air formed by this air cools the optical elements in the color-separating/combining optical system β housed inside the optical box 6. Most of this cooling air flows toward the PFC power supply board 8 and the ballast power supply board 10 adjacent to the optical box 6 to cool the electrical devices mounted on these boards 8 and 10. After that, the cooling air is exhausted to the outside of the chassis by the exhaust fan 18 and the power supply cooling fan 17.

In an airflow path C indicated by one-dot-chain-line arrows in FIG. 5, an air sucked through the air inlet 21b (not shown in FIG. 5) formed in the lower exterior case 21 flows into the airflow path C. A cooling air formed by this air is guided toward the ballast power supply board 10 and the PFC power supply board 8 together with an air inside the chassis by a sucking force of the power supply cooling fan 17 or the exhaust fan 18. After cooling these boards 8 and 10, the cooling air is exhausted to the outside of the chassis by the power supply cooling fan 17 and the exhaust fan 18.

Figure 1:
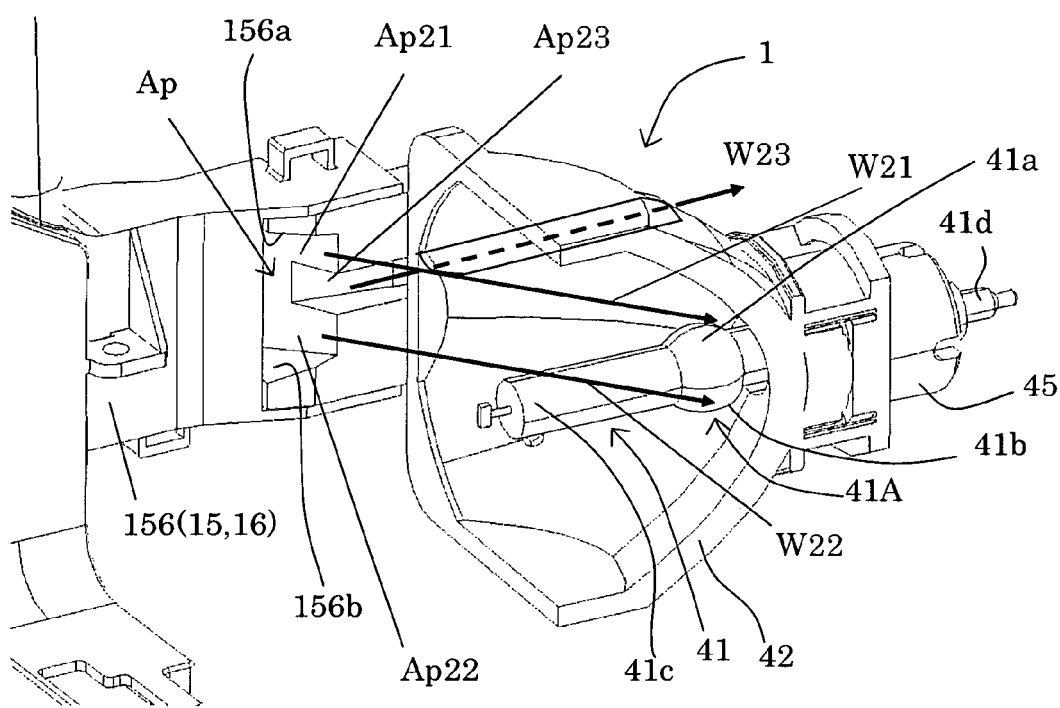
FIG. 1 is a perspective (partly sectional) view showing part of a cooling structure in a liquid crystal projector that is a first embodiment (Embodiment 1) of the present invention.
Figure 2:
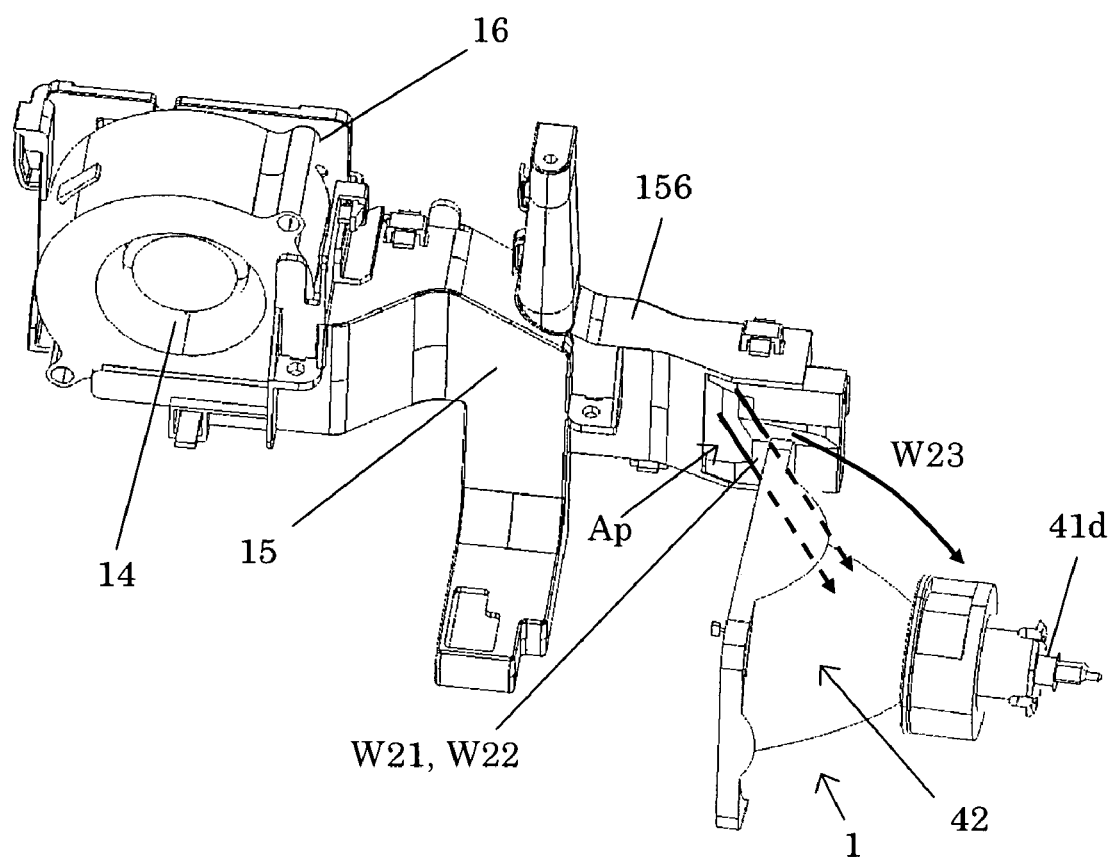
FIG. 2 is a perspective view showing the cooling structure of Embodiment 1.

Part of the above cooling structure which is formed in the vicinity of the lamp 1 will be explained in detail with reference to FIGS. 1 and 2. FIG. 1 shows a cut-away view of the reflector 42 so that the interior of the lamp 1 is visible.

Figure 7:
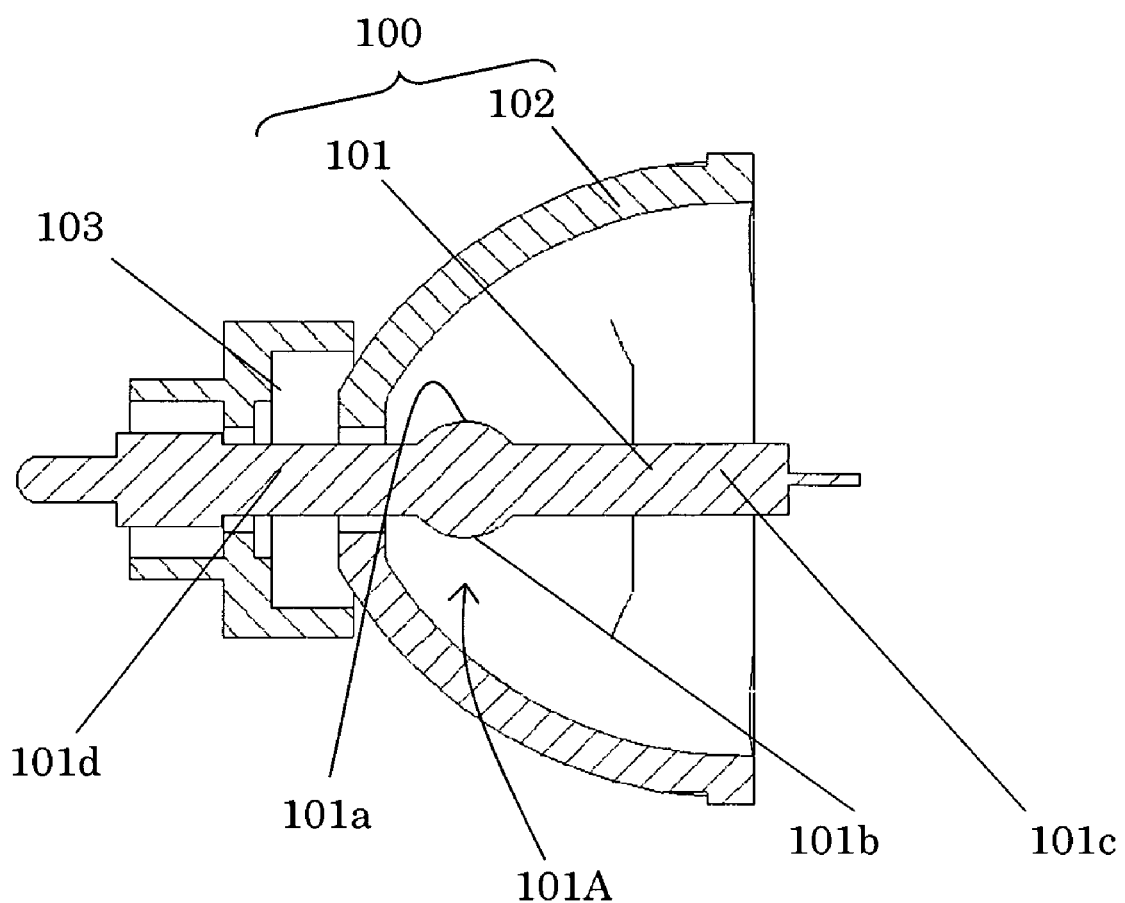
FIG. 7 is a sectional view of a light source lamp.
Figure 8:
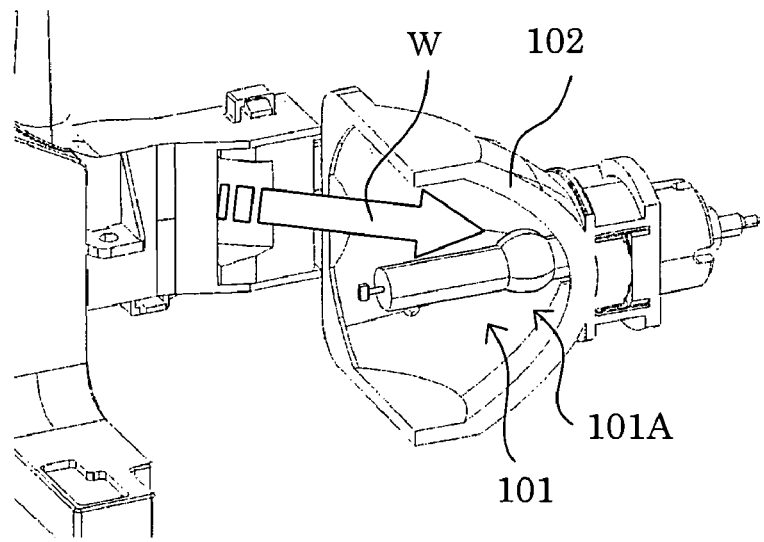
FIG. 8 is a perspective view showing a conventional cooling structure for the light source lamp.
Figure 9:
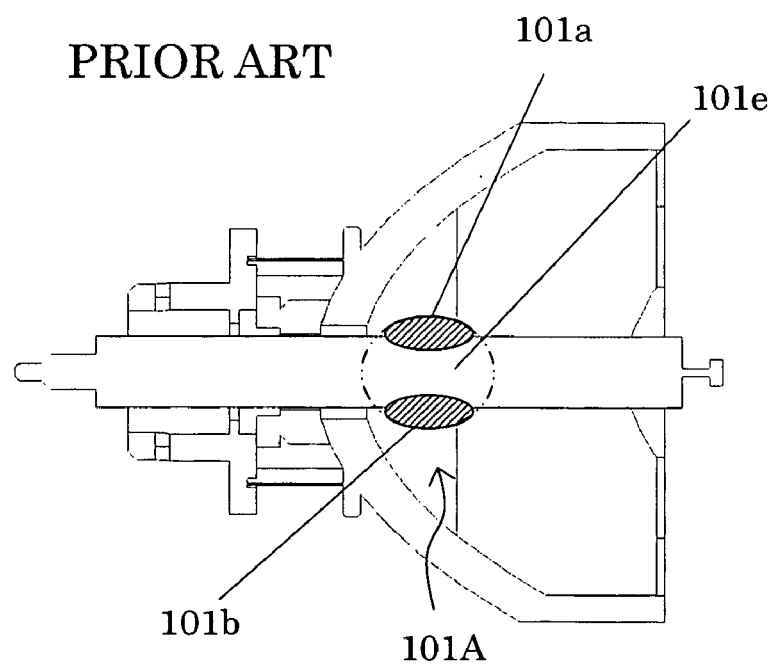
FIG. 9 is an explanatory diagram of the light source lamp.

The light emitting tube 41 includes a spherical light emitting portion 41A, and a first sealing portion (electrode portion) 41c and a second sealing portion (electrode portion) 41d which respectively extend to a front side and a back side from the light emitting portion 41A. The light emitting tube 41 is connected to the reflector 42 by a connecting member 45 (denoted by reference numeral 103 in FIG. 7).

The light emitting portion 41A and the first sealing portion 41c of the light emitting tube 41 are disposed inside the reflector 42, while the second sealing portion 41d is covered by the connecting member 45 and disposed outside (on the back side) of the reflector 42.

Combining the first lamp duct 15 and the second lamp duct 16 mentioned above forms a square tubular duct 156. The cooling air from the lamp cooling fan 14 held by the lamp ducts 15 and 16 is guided through the duct 156 to the vicinity of the lamp 1 and is supplied to the lamp 1 through an opening Ap formed at the distal end of the duct 156. In this embodiment, a centrifugal fan is used as the lamp cooling fan 14.

As described above, the reflector 42 and the explosion-proof glass 3 (omitted in FIG. 1; see FIG. 3) are held by a lamp holder 2 (omitted in FIG. 1; see FIG. 3). The lamp holder 2 has an opening (not shown) at a position facing the opening Ap of the duct 156 for introducing a cooling air into the inside of the reflector 42.

At the opening Ap of the duct 156, on the other hand, first to third air guiding portions Ap21 to Ap23 are provided. More specifically, the first air guiding portion Ap21 and the second air guiding portion Ap22 are formed separately in the vertical direction, and the third air guiding portion Ap23 is formed between these first and second air guiding portions Ap21 and Ap22.

The first and second air guiding portions Ap21 and Ap22 are formed as guide surfaces for respectively directing parts W21 and W22 of the cooling air that has reached the opening Ap toward an upper area 41*a* and a lower area 41*b* on the outer circumferential surface of the light emitting portion 41A, which is disposed inside the reflector 42, of the light emitting tube 41. More specifically, the first and second air guiding portions Ap21 and Ap22 are formed to have a slope or curved surface shape. They are formed such that the upper and lower areas 41*a* and 41*b* of the light emitting portion 41A are located on extend lines extending from these slope or curved surfaces.

The upper and lower areas herein are upper and lower areas when a direction in which short sides of a projected image (e.g. a long side length: a short side length=4:3 or 16:9) extend is defined as the vertical direction, with the projector being in a state of projecting images, i.e., installed on a table or hung from a ceiling. In other words, the upper and lower areas correspond to first and second areas opposite to each other on the outer circumferential surface of the light emitting portion 41A.

An upper surface 156*a* and a lower surface 156*b* provided at the opening Ap of the duct 156 have a shape for collecting the cooling airs W21 and W22 toward the upper and lower areas 41*a* and 41*b* of the light emitting portion 41A while suppressing diffusion of the cooling airs W21 and W22 in the vertical direction.

Moreover, the third air guiding portion Ap23 is formed to have a groove shape between the first and second air guiding portions Ap21 and Ap22. This third air guiding portion Ap23 guides and directs another part (W23) of the cooling air that has reached the opening Ap toward the side of the second sealing portion (electrode portion) 41*d* disposed on the back side of the reflector 42.

The first to third air guiding portions Ap21 to Ap23 thus divide the cooling air that has reached the opening Ap and direct the divided cooling airs toward the upper and lower areas 41*a* and 41*b* and the second sealing portion 41*d* (electrode portion side) of the light emitting portion 41A, which require temperature control, to cool these portions. The inventors' investigation revealed that setting the ratio of the flow volumes of the cooling airs W21, W22, and W23 to 1:1:1 or similar enables adequate cooling of the upper and lower areas 41*a* and 41*b* and the second sealing portion 41*d* of the light emitting portion 41A.

In this embodiment, the first and second air guiding portions Ap21 and Ap22 are separated in the vertical direction, and the third air guiding portion Ap23 is provided between these first and second air guiding portions Ap21 and Ap22. This causes the cooling airs W21 and W22 to be directly blown to the upper and lower areas 41*a* and 41*b*, for which temperature control is important, of the light emitting portion 41A. On the other hand, the cooling air is not guided toward a side face area, for which temperature control is not important, of the light emitting portion 41A.

Moreover, the cooling air that is not guided to the side face area of the light emitting portion 41A is supplied toward the second sealing portion 41*d*, for which temperature control is important, through the third air guiding portion Ap23.

Note, temperature control for the other (first) sealing portion (electrode portion) 41*c*, which is disposed inside the reflector 42, is also important. However, the temperature of the first sealing portion 41*c* does not become as high as that of the light emitting portion 41A, and therefore it is cooled to be within an appropriate temperature range due to circulation of the cooling airs W21 and W22 inside the reflector 42 or convection of an air thereinside.

The temperature of the second sealing portion 41*d* disposed outside the reflector 42 does not either become as high as that of the light emitting portion 41A, and it is also cooled by an airflow created around the light source lamp 1 by the exhaust fan 18. Therefore, the flow volume of the cooling air W23 guided toward the second sealing portion 41*d* through the third air guiding portion Ap23 can be smaller than those of the cooling airs W21 and W22 for cooling the light emitting tube 41.

The configuration described above enables efficient and adequate cooling of portions that need to be cooled in the lamp even though the flow volume of the cooling air from the lamp cooling fan 14 is small. Accordingly, the rotation speed of the lamp cooling fan 14 can be reduced without lowering performance or lifetime of the light emitting tube 41, and a low-noise projector can be realized.

As described above, the projector may be installed on a table or hung from a ceiling upside down when being used, i.e., the upper and lower areas of the light emitting portion 41A may be inverted depending on the above. However, since the cooling airs are blown to the upper and lower areas of the light emitting portion 41A in this embodiment, the portions that need to be cooled in the lamp 1 are efficiently and adequately cooled irrespective of the usage pattern.

Moreover, the cooling air W23 guided toward the second sealing portion 41*d* is also used for cooling the lamp case portion 6*a* and the lamp lid 28 covering the lamp 1 and further the exterior members (the lower exterior case 21, the upper exterior case 22, and the second side plate 24) closely arranged thereto at the circumference thereof, which are shown in FIG. 3. The lamp case portion 6*a* and the exterior members are basically cooled by an airflow formed by the exhaust fan 18.

However, adding part of the cooling air W23 from the lamp cooling fan 14 for cooling them makes it possible to further reduce the temperature of the exterior members and to decrease the rotation speed of the exhaust fan 18, enabling a further noise reduction.

Embodiment 2

Figure 6:
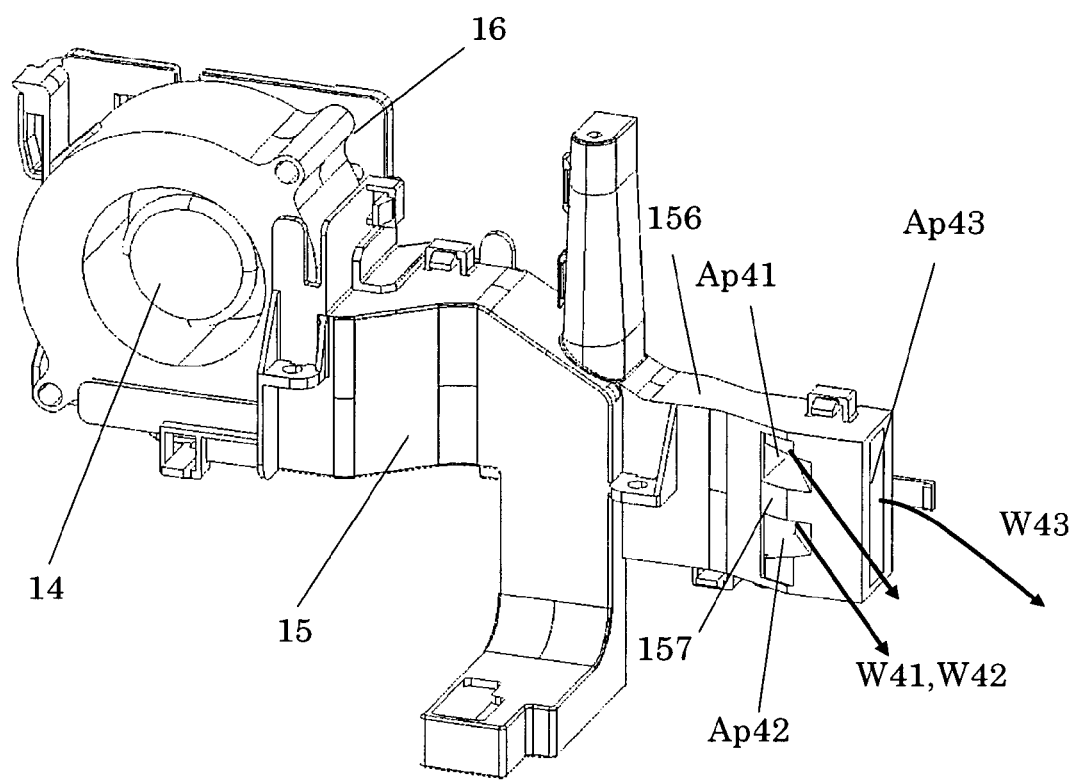
FIG. 6 is a perspective view showing part of a cooling structure in a liquid crystal projector that is a second embodiment (Embodiment 2) of the present invention.

FIG. 6 shows a cooling structure for the lamp 1 in a liquid crystal projector that is a second embodiment (Embodiment 2) of the present invention. The basic configuration of the liquid crystal projector of this embodiment is the same as that of Embodiment 1. In FIG. 6, parts similar to or parts having similar functions to those in Embodiment 1 are designated by the same reference numerals as those in Embodiment 1.

In this embodiment, a cooling air from the lamp cooling fan 14 is divided into two at an intermediate position in the duct 156 (at a position closer to the fan 14 than first and second air guiding portions which will be described later). One of the two is supplied to the inside of the reflector 42 as a cooling air (W41+W42), and the other is supplied toward the second sealing portion 41*d* as a cooling air W43. After that, the cooling air (W41+W42) is separated by the first and second air guiding portions Ap41 and Ap42 into a cooling air W41 and a cooling air W42, which respectively proceed to the upper and lower areas on the outer circumferential surface of the light emitting portion 41A.

The first and second air guiding portions Ap41 and Ap42 are formed as guide surfaces which have a slope or curved surface shape similarly to those in Embodiment 1 such that the upper and lower areas of the light emitting portion 41A are located on extended lines thereof. Between the first and second air guiding portions Ap41 and Ap42, a wall portion 157 for separating the cooling airs W41 and W42 in the vertical direction is formed.

The wall portion 157 provides wall surfaces for collecting the cooling airs W41 and W42 toward the upper and lower areas of the light emitting portion 41A together with an upper surface of the first air guiding portion Ap41 and a lower surface of the second air guiding portion Ap42.

The cooling air W43 is guided by the third air guiding portion Ap43 formed at the distalmost end of the duct 156 to proceed toward the second sealing portion 41d.

Also in this embodiment, similarly to Embodiment 1, even though the flow volume of the cooling air from the lamp cooling fan 14 is small, the portions that need to be cooled in the lamp 1 are efficiently and adequately cooled. Accordingly, the rotation speed of the lamp cooling fan 14 can be reduced without lowering performance or lifetime of the light emitting tube 41, and a low-noise projector can be realized.

The cooling air W43 guided toward the second sealing portion 41d is also used for cooling the lamp case portion 6a, lamp lid 28, and exterior members 21, 22, and 24. This makes it possible to further reduce the temperature of the exterior members and to decrease the rotation speed of the exhaust fan 18, enabling a further noise reduction.

According to each of the embodiments described above, part of the cooling air is directed, by the first and second air guiding portions, to the first and second areas opposite to each other (for example, upper and lower areas) on the outer circumferential surface of the light emitting portion. The cooling air (another part) that is not used for the cooling of the first and second areas is directed, by the third air guiding portion, to the side of the electrode portion disposed outside of the reflector. This makes it possible to efficiently guide the cooling air to the portions, which need temperature control and are disposed inside and outside of the reflector, of the light emitting tube. As a result, noise from the apparatus (projector) can be reduced without lowering performance or lifetime of the light emitting tube.

Furthermore, the present invention is not limited to these embodiments and various variations and modifications may be made without departing from the scope of the present invention.

For example, the lamp cooling fan is not limited to a centrifugal fan, and an axial flow fan may be used. The reflective liquid crystal panel may be substituted by a transmissive liquid crystal panel or a digital micromirror device (DMD).

This application claims the benefit of Japanese Patent Application No. 2007-196743, filed on Jul. 27, 2007, which is hereby incorporated by reference herein in its entirety.

What is claimed is:

1. An image projection apparatus, comprising:
   a light source lamp including a discharge light emitting tube and a reflector, the discharge light emitting tube including a light emitting portion disposed inside of the reflector and an electrode portion disposed outside of the reflector;
   a cooling fan; and
   a duct configured to guide a cooling air flowed by operation of the cooling fan toward the light source lamp,
   wherein the duct includes a first air guiding portion and a second air guiding portion that cause parts of the cooling air to respectively proceed toward a first area and a second area opposite to each other on an outer circumferential surface of the light emitting portion, and a third air guiding portion that causes another part of the cooling air to proceed toward the electrode portion.

2. An image projection apparatus according to claim 1, wherein the third air guiding portion is provided between the first and second air guiding portions.

3. An image projection apparatus according to claim 1, wherein the first and second areas are an upper area and a lower area on the outer circumferential surface of the light emitting portion when a vertical direction is defined as a direction in which short sides of an image projected by the apparatus extend.

* * * * *